US012395386B2

(12) United States Patent
Eom et al.

(10) Patent No.: US 12,395,386 B2
(45) Date of Patent: Aug. 19, 2025

(54) ELECTRONIC DEVICE AND OFFSET CALIBRATION METHOD

(71) Applicant: SAMSUNG ELECTRONICS CO., LTD., Suwon-si (KR)

(72) Inventors: Seungsik Eom, Suwon-si (KR); Youngjin Chung, Suwon-si (KR); Sangyun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 18/368,262

(22) Filed: Sep. 14, 2023

(65) Prior Publication Data

US 2024/0137252 A1    Apr. 25, 2024
US 2024/0235905 A9    Jul. 11, 2024

(30) Foreign Application Priority Data

Oct. 20, 2022  (KR) .......................... 10-2022-0136009
Mar. 10, 2023  (KR) .......................... 10-2023-0031876

(51) Int. Cl.
*H04L 25/06*       (2006.01)
*G06F 8/65*        (2018.01)
*H04L 25/03*       (2006.01)

(52) U.S. Cl.
CPC .............. *H04L 25/061* (2013.01); *G06F 8/65* (2013.01); *H04L 25/03885* (2013.01)

(58) Field of Classification Search
CPC .... H04L 25/061; H04L 25/03885; G06F 8/65
See application file for complete search history.

(56) References Cited

U.S. PATENT DOCUMENTS

| 8,699,648 | B1  | 4/2014  | Chan et al. |
| 9,384,791 | B1  | 7/2016  | Chan et al. |
| 9,608,587 | B2  | 3/2017  | Waheed et al. |
| 9,621,176 | B2  | 4/2017  | Mishra et al. |
| 9,948,484 | B2  | 4/2018  | Roh et al. |
| 11,316,726 | B2 | 4/2022  | Patil et al. |
| 11,431,416 | B2 | 8/2022  | Gopalakrishnan et al. |
| 2015/0358005 | A1* | 12/2015 | Chen ..................... H04L 25/061 375/233 |
| 2016/0173299 | A1* | 6/2016 | Islam ..................... H04L 25/06 375/232 |

(Continued)

FOREIGN PATENT DOCUMENTS

KR        10-2219849 B1       2/2021

OTHER PUBLICATIONS

Extended European Search Report dated Mar. 1, 2024 in European Application No. 23204956.9.

(Continued)

*Primary Examiner* — Freshteh N Aghdam
(74) *Attorney, Agent, or Firm* — Sughrue Mion, PLLC

(57) ABSTRACT

An electronic device includes an analog front end (AFE) circuit including plural modules, and a processor that provides a user interface for a firmware update, determines a target module, of which offset calibration is to be performed, among the plural modules, based on a user input to the user interface, determines a position within in the AFE circuit to which a common mode voltage is to be applied to perform the offset calibration of the target module, and determines an offset calibration sequence including the target module and the position.

20 Claims, 14 Drawing Sheets

(56) References Cited

U.S. PATENT DOCUMENTS

2016/0378154 A1* 12/2016 Srivastava .............. G06F 13/42
                                                          713/300
2017/0131730 A1*  5/2017 Joffe ...................... H04B 10/40
2021/0272618 A1   9/2021 Kim et al.

OTHER PUBLICATIONS

Andres et al., "A digital offset correction method for high speed analog front-ends", 2016 29th Symposium on Integrated Circuits and Systems Design (SBCCI) IEEE, Aug. 29, 2016 (4 pages total).
Noguchi et al., "On-Chip Multi-Channel Monitoring for Analog Circuit Diagnosis in Systems-on-Chip Integration", IEICE Transactions on Electrons, Jun. 2007, vol. E90-C, No. 6, 1189-1196 (8 pages total).

* cited by examiner

ELECTRONIC DEVICE AND OFFSET CALIBRATION METHOD

CROSS-REFERENCE TO RELATED APPLICATIONS

This application is based on and claims priority under 35 U.S.C. § 119 to Korean Patent Application No. 10-2022-0136009, filed on Oct. 20, 2022, and to Korean Patent Application No. 10-2023-0031876, filed on Mar. 10, 2023, in the Korean Intellectual Property Office, the disclosure of each of which being incorporated by reference herein in their entireties.

BACKGROUND

The present disclosure relates to an electronic device, and more particularly, to a method, performed by an electronic device, of performing an offset calibration.

An analog front end (AFE) is a block configured to digitize an analog signal in a digital system for digital signal processing of the analog signal and indicates a circuit in which an analog pre-processing circuit and an analog-to-digital converter are integrated in a single chip.

SUMMARY

It is an aspect to provide a method of calibrating an offset by using an electronic device.

According to an aspect of one or more embodiments, there is provided an electronic device comprising an analog front end (AFE) circuit including a plurality of modules; and at least one processor configured to provide a user interface for a firmware update, determine a target module, of which offset calibration is to be performed, among the plurality of modules, based on a user input to the user interface, determine a position within in the AFE circuit to which a common mode voltage is to be applied to perform the offset calibration of the target module, and determine an offset calibration sequence including the target module and the position.

According to another aspect of one or more embodiments, there is provided a method comprising providing a user interface for firmware update; based on a user input to the user interface, determining a target module, for which offset calibration is to be performed, among a plurality of modules included in an analog front end (AFE) circuit; determining a position within the AFE circuit to which a common mode voltage is to be applied for performing the offset calibration of the target module; and determining a calibration sequence including the target module and the position.

According to yet another aspect of one or more embodiments, there is provided an analog front end (AFE) circuit comprising a continuous time linear equalizer (CLTE) module comprising an HF module and a video graphics array (VGA) module electrically connected to the HF module; a decision feedback equalizer (DFE) module electrically connected to the CLTE module; at least one 1-bit sampler electrically connected to the DFE module; at least one digital-to-analog converter (DAC) connected to the at least one 1-bit sampler and configured to convert an input digital code into an analog voltage signal and output the analog voltage signal; and a control module configured to provide a user interface for a firmware update and, based on a user input to the user interface, determine a target module of which offset calibration is to be performed, a position within the AFE circuit to which a common mode voltage is to be applied, and a digital code search scheme.

BRIEF DESCRIPTION OF THE DRAWINGS

Various embodiments will be more clearly understood from the following detailed description taken in conjunction with the accompanying drawings, in which.

DETAILED DESCRIPTION

An AFE circuit may include a plurality of modules (or amplifiers) configured to digitize an analog signal. Each module may have an offset caused by an interaction between elements included in the module. The offset may badly affect an operation of a semiconductor, and thus, research on technologies for offset calibration has been conducted.

Figure 1:
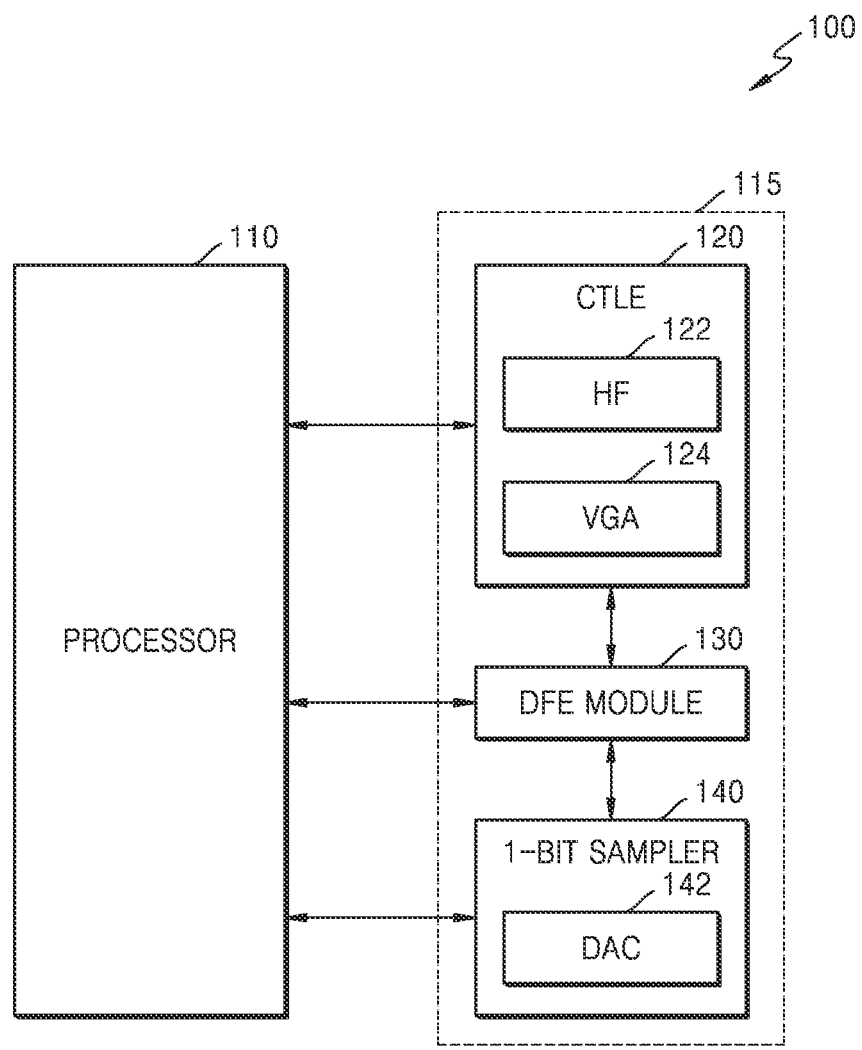
FIG. 1 is a block diagram of an electronic device according to some embodiments.

FIG. 1 is a block diagram of an electronic device 100 according to some embodiments.

Referring to FIG. 1, the electronic device 100 may include a processor 110 and an analog front end (AFE) circuit 115. The AFE circuit 115 may include a continuous time linear equalizer (CTLE) 120 including an high frequency module (HF) 122 and a video graphics array (VGA) 124, a decision feedback equalizer (DFE) module 130 connected to the CTLE 120 and including a DFE odd and a DFE even, and at least one 1-bit sampler 140 connected to the DFE module 130 and including a digital-to-analog converter (DAC) 142. In some embodiments, the DAC 142 may be provided for each of the at least one 1-bit sampler 140. That is, each 1-bit sampler 140 may include a DAC. In some embodiments, the DAC 142 may be provided outside of the at least one 1-bit sampler 140 and be connected to the at least one 1-bit sampler 140. The CTLE 120 may remove unnecessary frequency components or enhance specific frequency components. A bandwidth of an electrical channel may be compensated for by the CTLE 120.

The DFE module 130 may perform signal compensation by applying a weight to a detected 1 or 0 signal and feeding back the weight-applied signal. A bandwidth of an electrical channel (e.g., a transmission line) may be reduced due to physical effects (e.g., a skin effect, a dielectric loss, and reflection due to impedance discontinuity), and the DFE module 130 may flatten a channel response without amplifying noise or crosstalk and reduce signal distortion. The DFE module 130 may include the DFE odd configured to receive a signal at an odd-numbered clock and the DFE even configured to receive a signal at an even-numbered clock, thereby improving a driving speed.

The 1-bit sampler 140 may receive an input signal and output an output signal. The 1-bit sampler 140 may receive an input signal, compare a voltage level of the input signal to a reference voltage, and output a result value as an output signal. According to an embodiment, the 1-bit sampler 140 may output 1 V if a voltage level of an input signal is greater than or equal to the reference voltage, and output 0 V if the voltage level of the input signal is less than the reference voltage. For example, a 1-bit sampler, of which the reference voltage is 0.5 V, may output 1 V if a voltage level of an input signal is 1 V that is greater than the reference voltage of 0.5 V, and output 0 V if the voltage level of the input signal is 0 V that is less than the reference voltage of 0.5 V. Hereinafter, it is assumed that 1 V is output if a voltage level of an input signal is greater than the reference voltage and 0 V is output if the voltage level of the input signal is less than the reference voltage. However, the operation of the 1-bit sampler described above is illustrative, and an operation of the 1-bit sampler 140 is not limited thereto. For example, the reference voltage of the 1-bit sampler 140 may have various values, and a value of an output voltage output when a voltage level of an input signal is greater or less than the reference voltage may also be various.

The electronic device 100 may include a plurality of 1-bit samplers 140. When the plurality of 1-bit samplers 140 are included in the electronic device 100, each 1-bit sampler 140 may have a different reference voltage. For example, a first reference voltage of a first 1-bit sampler may be 0 V, a second reference voltage of a second 1-bit sampler may be 0.5 V, and a third reference voltage of a third 1-bit sampler may be 1 V. The electronic device 100 may apply the same input voltage to the first 1-bit sampler, the second 1-bit sampler, and the third 1-bit sampler and identify an approximate voltage level of the input voltage based on output voltages of the first 1-bit sampler, the second 1-bit sampler, and the third 1-bit sampler. For example, when the first 1-bit sampler, the second 1-bit sampler, and the third 1-bit sampler output 0 V, 0 V, and 1 V, respectively, in response to the same input voltage, the electronic device 100 may determine that the input voltage is greater than the second reference voltage and less than the third reference voltage.

According to an embodiment, the processor 110 may determine an input offset voltage for compensating for an offset included in the 1-bit sampler 140. The 1-bit sampler 140 may include the DAC 142. The DAC 142 may receive a digital code and convert the received digital code into an analog voltage. The processor 110 may determine the digital code based on an output voltage and input the digital code to the DAC 142 to compensate for the offset. For example, the output voltage may be an output voltage of the 1-bit sampler 140. An analog voltage (input offset voltage) converted by the DAC 142 from the digital code may be a voltage for compensating for an offset of a corresponding module. An offset indicates a voltage output due to an electrical action between resistors in a module even though an input voltage is 0 V. An offset may reduce the magnitude comparison accuracy of the 1-bit sampler 140, and thus may be reduced using an input offset voltage to compensate.

According to an embodiment, the electronic device 100 may include a plurality of modules implemented as the 1-bit sampler 140. For example, in the electronic device 100, an error even path (EREP), a data even path (DAEP), and an edge even path (EDEP) electrically connected to the DFE even module may be the 1-bit sampler 140. For example, in the electronic device 100, an edge odd path (EDOP), a data odd path (DAOP), and an error odd path (EROP) electrically connected to the DFE odd module may be the 1-bit sampler 140.

The processor 110 may perform offset calibration of a plurality of modules included in the AFE circuit 115 including the CLTE 120, the DFE module 130, and the 1-bit sampler 140. An offset indicates a voltage value output when an input voltage is 0 V, and offset calibration indicates that the offset is compensated for using an input offset voltage. The processor 110 may apply a common mode voltage to one node of the AFE circuit 115 and measure an output voltage of the AFE circuit 115 at an output end of the AFE circuit 115. The common mode voltage is a voltage close to 0 V, and when the common mode voltage is input, an output voltage of the AFE circuit 115 is 0 V in an ideal case where no offset is present in each module included in the AFE circuit 115. If the output voltage of the AFE circuit 115 is not 0 V, the processor 110 may determine that an offset is present in at least one module of the AFE circuit 115. The processor 110 may determine an offset value of the at least one module based on the output voltage of the AFE circuit 115 and input a digital code for compensating for the offset to the DAC 142 electrically connected to the at least one module. The DAC 142 may convert the input digital code into an input offset voltage having a corresponding voltage level. The at least one module may receive an input voltage received from a front end thereof and the input offset voltage and output an offset-compensated voltage. A particular process, performed by the processor 110, of performing offset calibration is described below with reference to FIGS. 2A to 2G.

The processor 110 may determine sequences of performing offset calibration of the plurality of modules. In each sequence, a target module of which offset calibration is to be performed, a position to which the common mode voltage is to be applied when each module is calibrated, and a code search scheme may vary. For example, in a first sequence, a first module may be a target module, the common mode voltage may be applied to a front end of the first module, and a digital code may be determined according to a determined scheme. In a second sequence, a module different from the first module in the first sequence may be calibrated as a target module, and a position to which the common mode voltage is to be applied and a code search scheme may vary. The processor 110 may configure N sequences and perform offset calibration by sequentially performing the configured N sequences. For example, the processor 110 may sequentially perform first to Nth sequences upon receiving a calibration command. According to an embodiment, the processor 110 may set a sequence stop flag at a start point and/or an end point of a sequence. The processor 110 may stop execution of a sequence in response to identifying the sequence stop flag. For example, the processor 110 may stop execution of a sequence in response to identifying the sequence stop flag in the fourth sequence while sequentially performing an offset calibration sequence from the first sequence. That is, in this example, the processor 110 may perform a first sequence, a second sequence, and a third sequence and then stop at the fourth sequence.

The processor 110 may provide, on firmware, a user interface on which the offset calibration sequence may be configured. According to an embodiment, the processor 110 may provide the user interface, on which the offset calibration sequence may be configured, in an initial firmware configuration. A user may freely configure each sequence of offset calibration by using the user interface.

The processor 110 may perform a code search to determine a digital code for compensating for an offset. The processor 110 may divide a unit voltage (e.g., 1 V) into N voltage levels and generate a digital code corresponding to each voltage level. The processor 110 may search for an input offset voltage which may compensate for an offset of a module, while sequentially inputting digital codes to the DAC 142. The processor 110 may compensate for an offset of a module by inputting a digital code of a case where an output voltage of the module is closest to 0 V.

For example, when the processor 110 divides the unit voltage into 10 voltage levels (e.g., 0.1 V, 0.2 V, 0.3 V, . . . , and 1 V), 10 digital codes (e.g., h'0, h'1, h'2, . . . , and h'9) may be generated. The processor 110 may search for a digital code of a case where an output voltage is closest to 0 V, by sequentially inputting the digital codes to the DAC 142 of a target module. Because a digital code corresponds to a quantized voltage level of the unit voltage, an offset having an analog value cannot be perfectly compensated for, but an optimal input offset voltage may be selected to minimize an influence exerted by the offset to an output voltage. A code search scheme, performed by the processor 110, of searching for a digital code is described below with reference to FIGS. 5 and 6.

FIGS. 2A to 2G illustrate an operation, performed by an electronic device, of performing offset calibration of a DFE even module and a module connected to the DFE even module, according to some embodiments.

Figure 3:
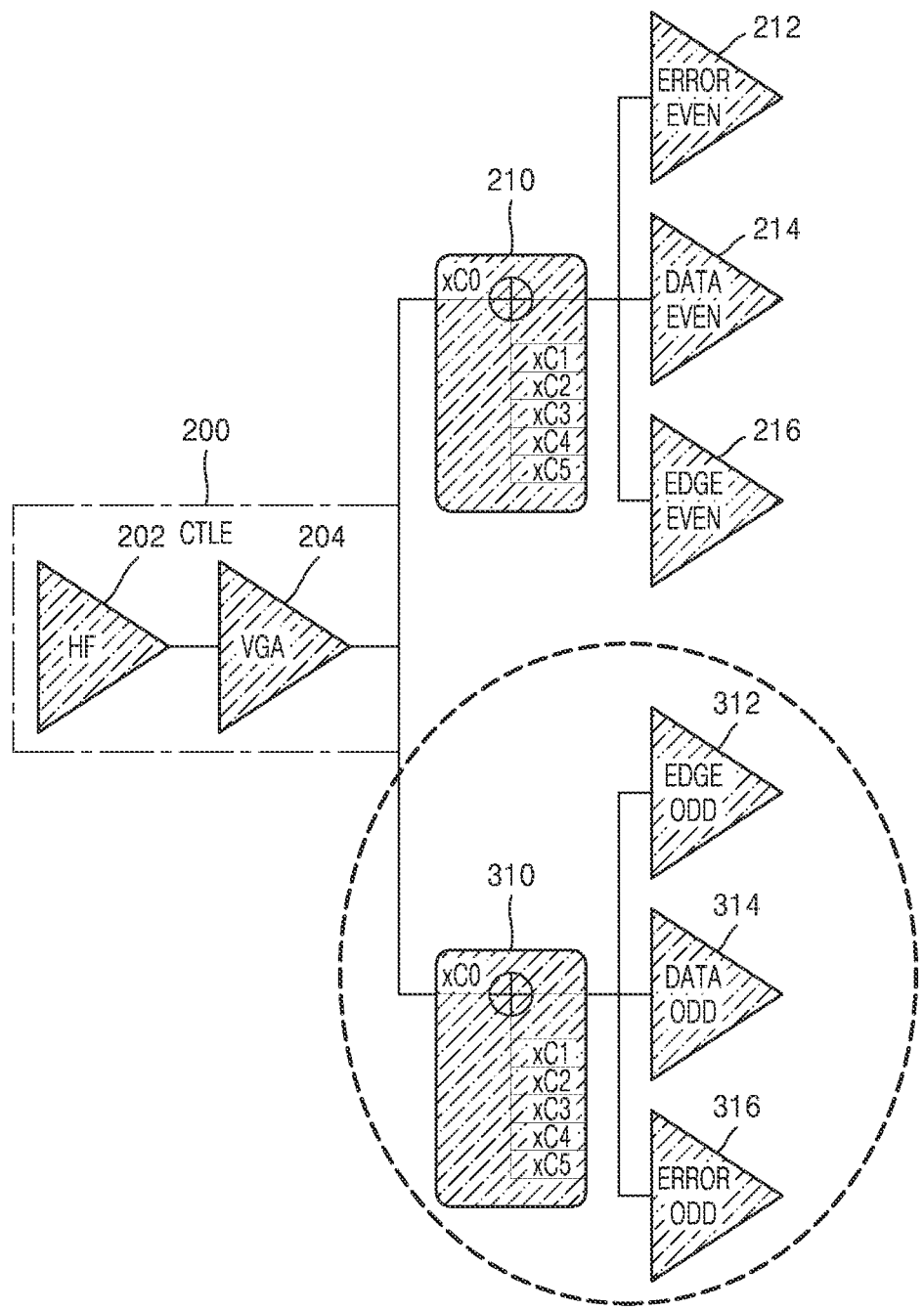
FIG. 3 illustrates an operation, performed by an electronic device, of calibrating a DFE odd module and modules connected to the DFE odd module, according to some embodiments.

FIG. 3 illustrates an operation, performed by an electronic device, of calibrating a DFE odd module and modules connected to the DFE odd module, according to some embodiments.

Figure 2A:
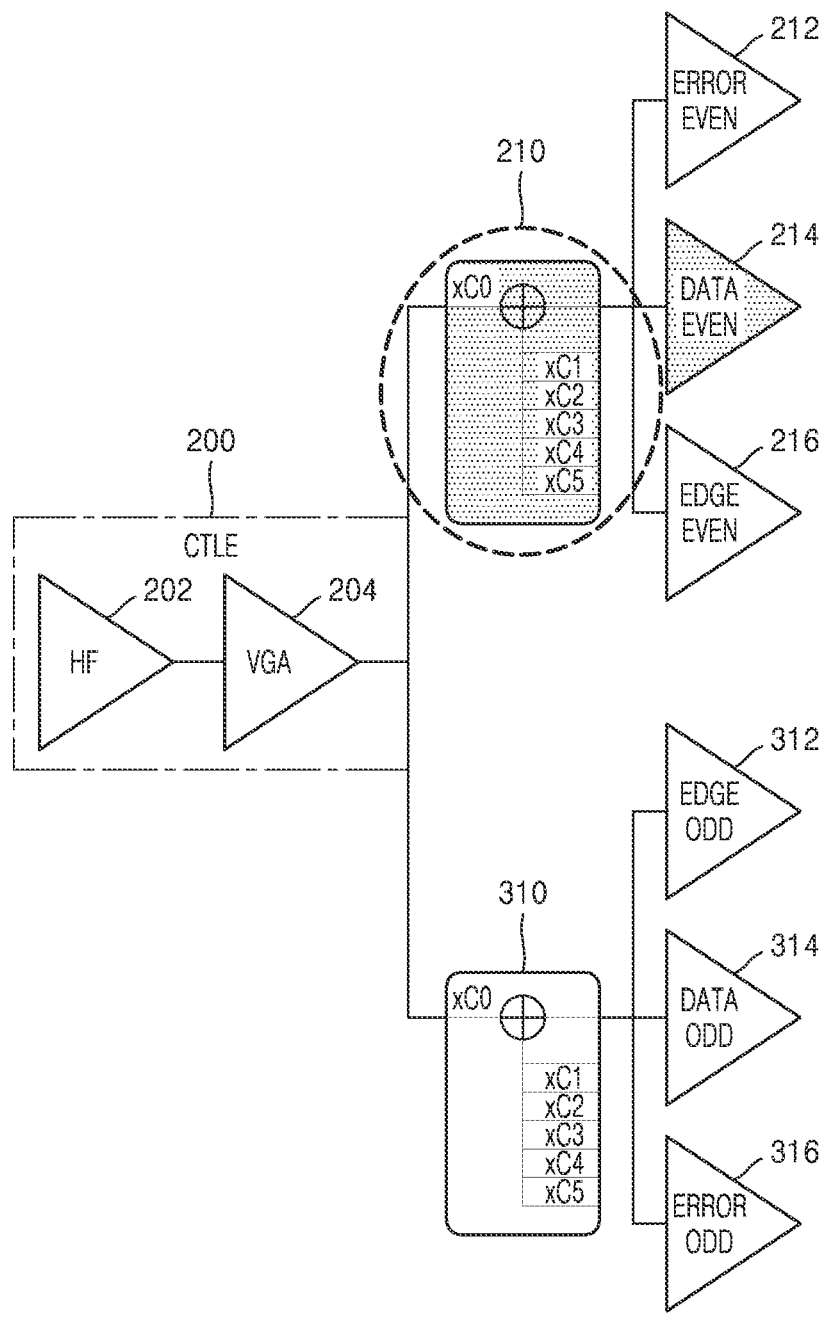
FIGS. 2A to 2G illustrate an operation, performed by an electronic device, of performing offset calibration of a decision feedback equalizer (DFE) even module and a module connected to the DFE even module, according to some embodiments.

A module for which the processor 110 may compensate for an offset through offset calibration is not limited to the modules shown in FIGS. 2A to 3. For example, the processor 110 may perform offset calibration by using a same process even when a plurality of modules are added to an AFE circuit or when the modules shown in FIGS. 2A to 3 are replaced with other modules. However, for convenience of description, hereinafter, it is assumed that the AFE circuit includes the modules shown in FIGS. 2A to 3.

The AFE circuit may include a CTLE 200 including an HF 202 and a VGA 204, a DFE even 210 and a DFE odd 310 electrically connected to the VGA 204, an error even (EREP) 212, a data even (DAEP) 214, and an edge even (EDEP) 216 electrically connected to the DFE even 210, and an edge odd (EDOP) 312, a data odd (DAOP) 314, and an error odd (EROP) 316 electrically connected to the DFE odd 310. The processor 110 may sequentially perform offset calibration of each module according to determined sequences. Because a voltage which the processor 110 may measure is only an output voltage of a 1-bit sampler, such as the DAEP 214, the processor 110 may compensate for a total offset of the AFE circuit in an order of first measuring and compensating for an offset of the 1-bit sampler, moving to a front end of the 1-bit sampler, measuring and compensating for an offset of a DFE, and measuring and compensating for an offset of modules in the CTLE 200.

In a first sequence, the processor 110 may calibrate the DFE even 210 and the DAEP 214 by applying the common mode voltage to a front end of the DFE even 210 and determining a digital code of the DAEP 214. In a second sequence, the processor 110 may calibrate the VGA 204, the DFE even 210, and the DAEP 214 by applying the common mode voltage to a front end of the VGA 204. In a third sequence, the processor 110 may calibrate the HF 202, the VGA 204, the DFE even 210, and the DAEP 214 by applying the common mode voltage to a front end of the HF 202 and determining a digital code of the HF 202. In a fourth sequence, the processor 110 may calibrate the HF 202, the VGA 204, the DFE even 210, and the DAEP 214 by applying the common mode voltage to the front end of the HF 202 and determining a digital code of the VGA 204. In a fifth sequence, the processor 110 may calibrate the HF 202, the VGA 204, the DFE even 210, and the DAEP 214 by applying the common mode voltage to the front end of the HF 202 and determining a digital code of the DAEP 214. In a sixth sequence, the processor 110 may calibrate the HF 202, the VGA 204, the DFE even 210, and the EDEP 216 by applying the common mode voltage to the front end of the HF 202 and determining a digital code of the EDEP 216. In a seventh sequence, the processor 110 may calibrate the HF 202, the VGA 204, the DFE even 210, and the EREP 212 by applying the common mode voltage to the front end of the HF 202 and determining a digital code of the EREP 212. In eighth to tenth sequences, the processor 110 may calibrate the HF 202, the VGA 204, the DFE odd 310, the DAOP 314, the EROP 316, and the EDOP 312 by applying the common mode voltage to the front end of the HF 202. The sequences and the calibration method described withe reference to FIGS. 2A to 3 are only illustrative, and a calibration method performed by the processor 110 is not limited thereto. Hereinafter, a process, performed by the processor 110, of sequentially performing offset calibration of each module is described in detail.

Referring to FIG. 2A, in the first sequence, the processor 110 may calibrate the DFE even 210 and the DAEP 214 by applying the common mode voltage to the front end of the DFE even 210 and determining the digital code of the DAEP 214. The processor 110 may measure an output voltage of the DAEP 214 to determine an offset of the DFE even 210 and the DAEP 214 and determine a digital code for compensating for the offset.

Figure 2B:
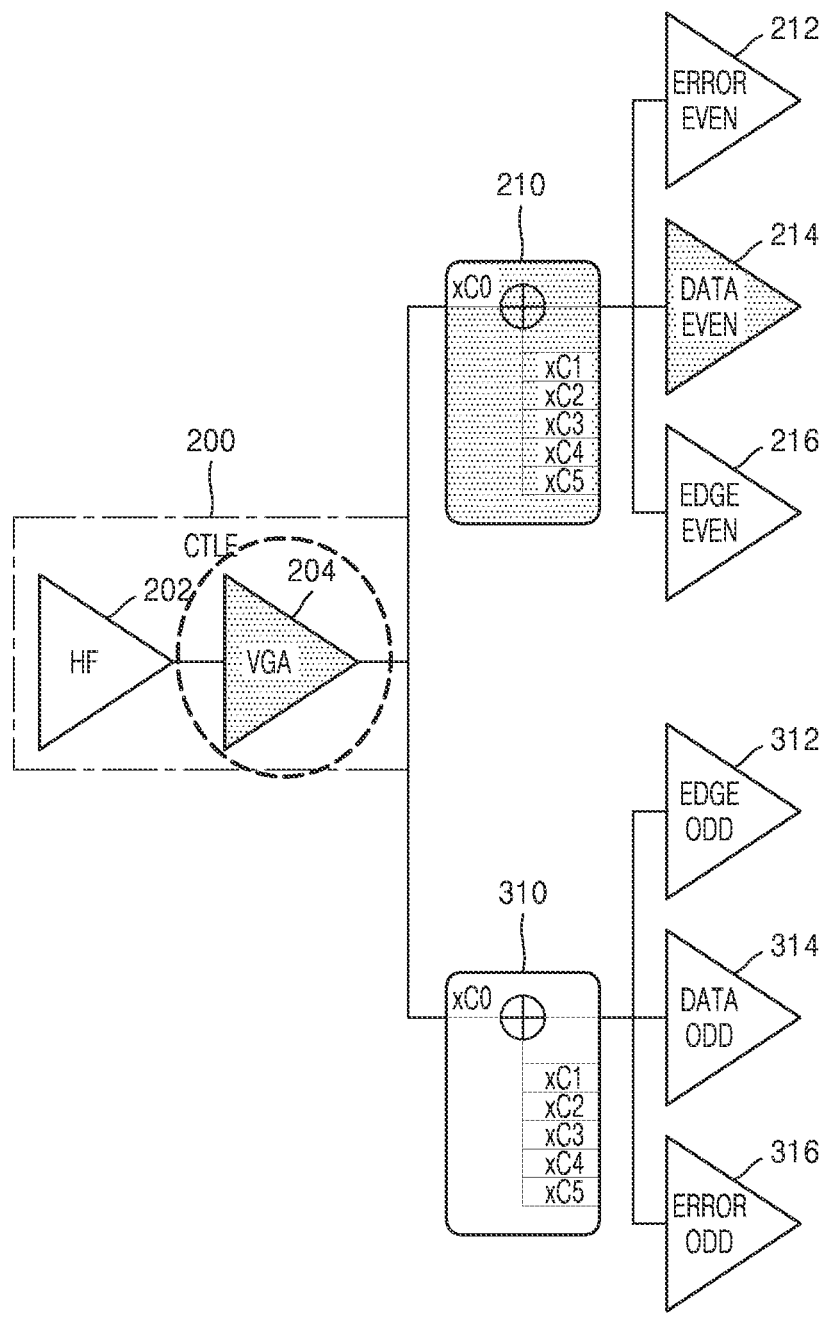

Referring to FIG. 2B, in the second sequence, the processor 110 may apply the common mode voltage to the front end of the VGA 204 to measure an output voltage of the DAEP 214 and calibrate the VGA 204, the DFE even 210, and the DAEP 214. Under the assumption that the offset of the DFE even 210 and the DAEP 214 calibrated in the first sequence is sufficiently small, the processor 110 may compensate for an offset of the VGA 204 by determining a digital code of the VGA 204 in the second sequence.

Figure 2C:
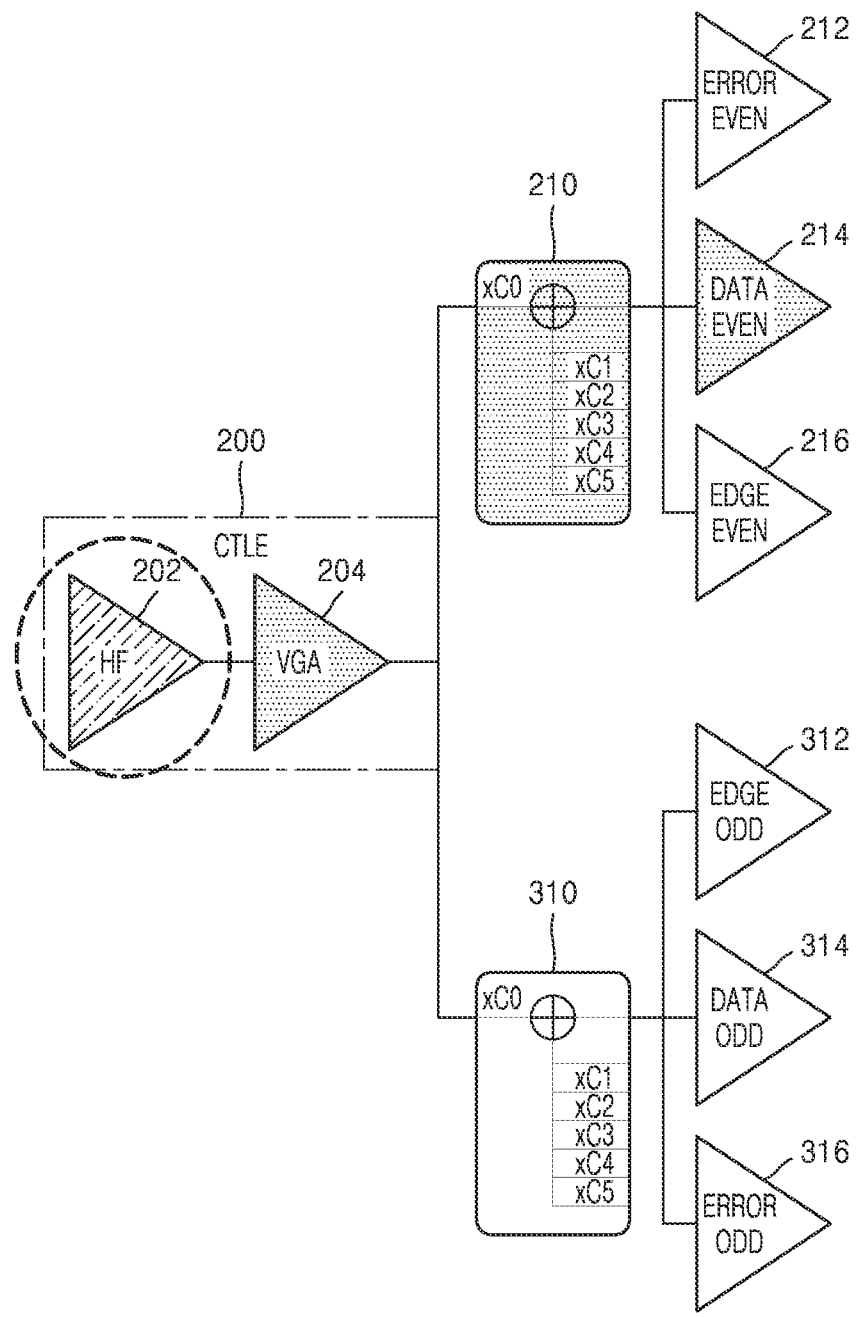

Referring to FIG. 2C, in the third sequence, the processor 110 may apply the common mode voltage to the front end of the HF 202 to measure an output voltage of the DAEP 214, and determine the digital code of the HF 202 to calibrate the HF 202, the VGA 204, the DFE even 210, and the DAEP 214. Under the assumption that an offset of the VGA 204, the DFE even 210, and the DAEP 214 calibrated through the first and second sequences is sufficiently small, the processor 110 may compensate for an offset of the HF 202 by determining a digital code of the HF 202 in the third sequence.

Through the process described with reference to FIGS. 2A to 2C, the processor 110 may compensate for an offset of all modules from the HF 202 to the DAEP 214 of the AFE circuit. However, as described above, an analog offset of each module cannot be perfectly compensated for only with a quantized input offset voltage. In this case, a residual offset amplified according to a gain of each module may increase as a stage progresses. When a gain of every module is g, and residual offsets of the HF 202, the VGA 204, the DFE even 210, and the DAEP 214 are $V_{HF}$, $V_{VGA}$, $V_{DFE\ EVEN}$, $V_{DAEP}$, respectively, a final residual offset $V_{RO}$ may be represented by Equation 1 below.

$$V_{RO}=g^4V_{HF}+g^3V_{VGA}+g^2V_{DFE\ EVEN}+gV_{DAEP} \quad \text{[Equation 1]}$$

Therefore, the digital codes determined when compensating for offsets in an order of a 1-bit sampler & a DFE→the VGA 204→the HF 202 may minimize an offset in each step but may not minimize a final offset due to an amplified residual offset remaining from a front end of each step. The processor 110 may perform calibration once more to compensate for a residual offset largely affecting an output voltage. For example the output voltage may be an output voltage of the DAEP 214. The calibration for compensating for a residual offset may be performed in a reverse order of the process described with reference to FIGS. 2A to 2C. This reverse order is because, in a process of compensating for a residual offset, an offset of each module is somewhat compensated for, and a final residual offset is small when a residual offset of the most front end (i.e., the HF 202 in this example) most largely affecting a final output voltage is first compensated for. Hereinafter, a process of performing calibration in a reverse order is described with reference to FIGS. 2D to 2E.

Figure 2D:
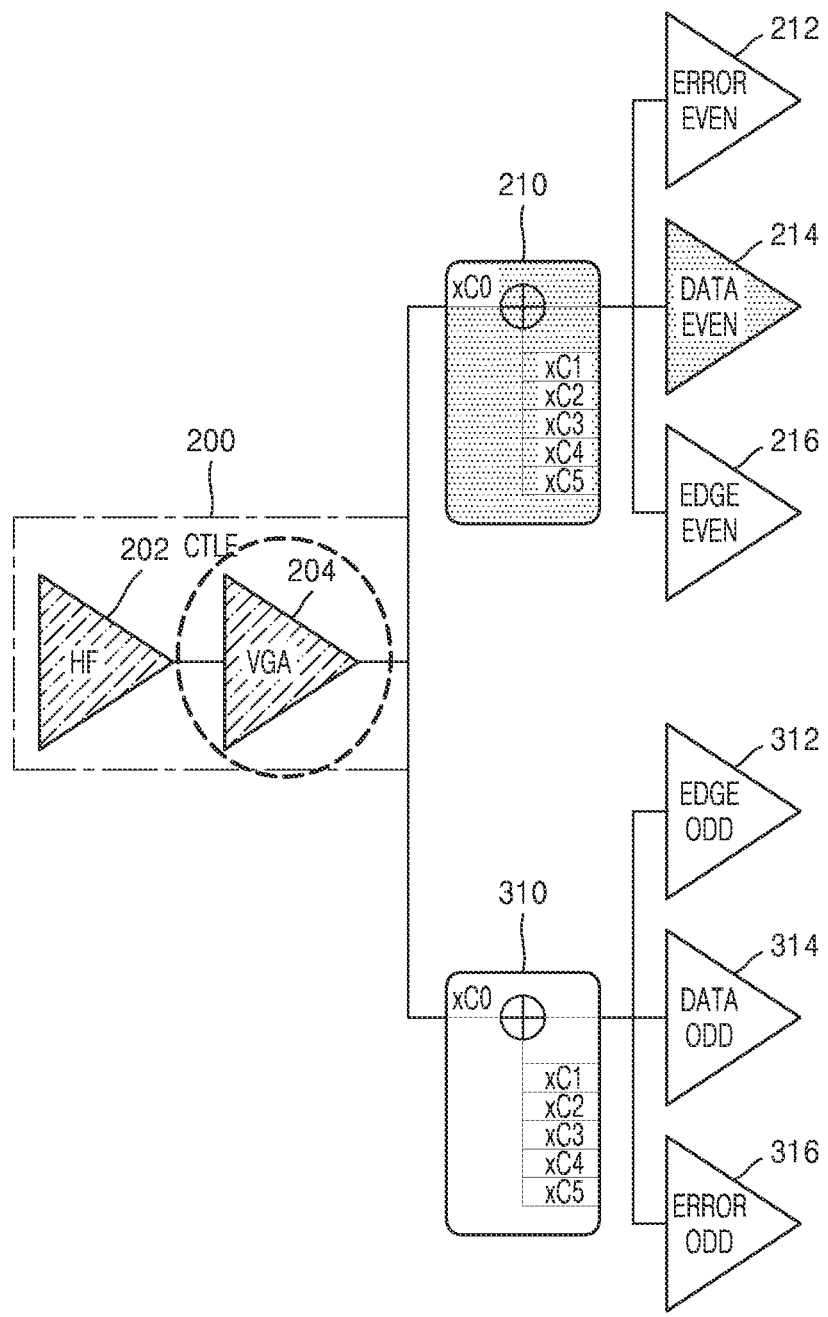

Referring to FIG. 2D, in the fourth sequence, the processor 110 may determine the digital code of the VGA 204 by applying the common mode voltage to the front end of the HF 202 and measuring an output voltage of the DAEP 214. In the fourth sequence, the processor 110 may calibrate the HF 202, the VGA 204, the DFE even 210, and the DAEP 214. Although the digital code of the VGA 204 has been already determined in the second sequence, the processor 110 may finely tune the digital code that was determined in the second sequence to compensate for a residual offset in the HF 202. The digital code of the VGA 204 determined in the second sequence may minimize a self-offset of the VGA 204, and the digital code of the VGA 204 tuned in the fourth sequence may minimize an offset of the VGA 204 by also considering the residual offset of the HF 202.

Figure 2E:
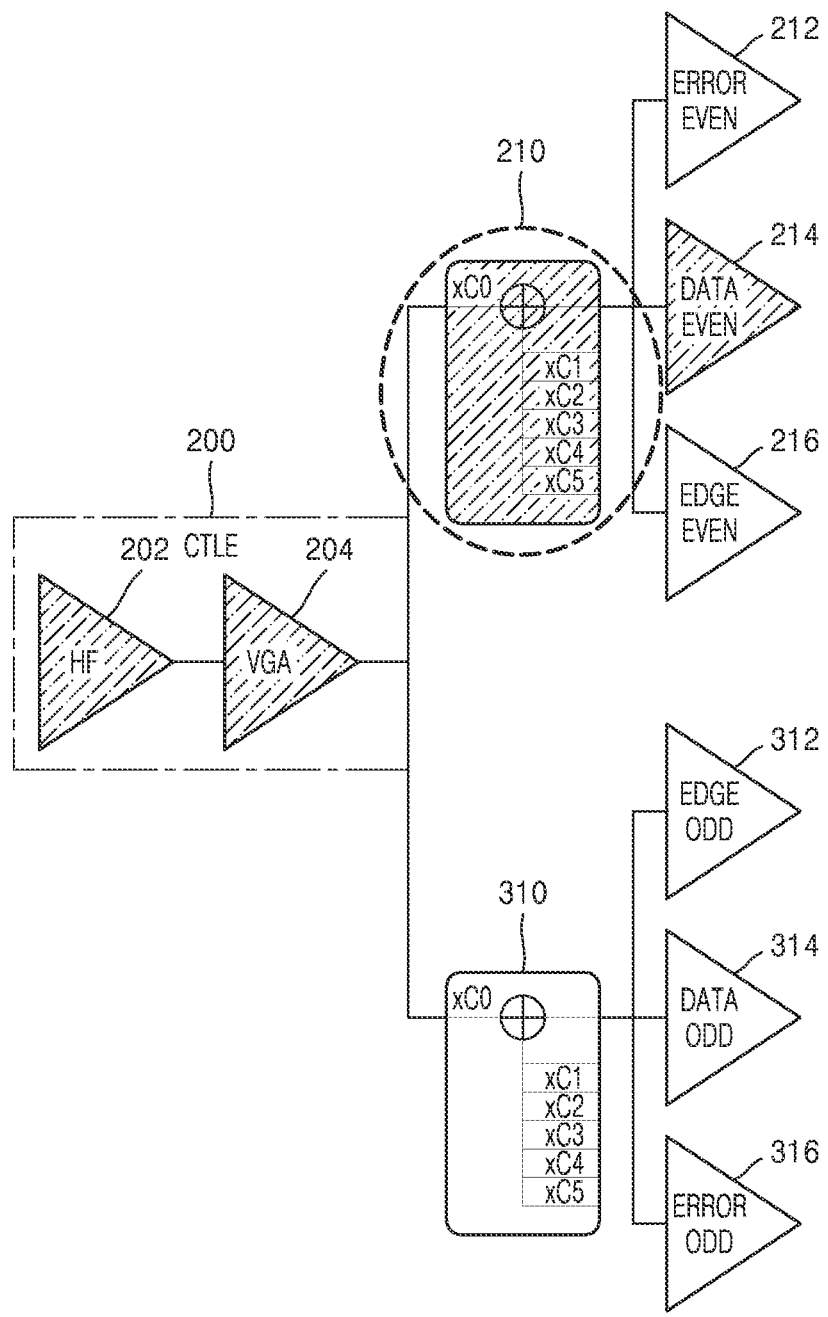

Referring to FIG. 2E, in the fifth sequence, the processor 110 may determine the digital code of the DAEP 214 by applying the common mode voltage to the front end of the HF 202 and measuring an output voltage of the DAEP 214. In the fifth sequence, the processor 110 may calibrate the HF 202, the VGA 204, the DFE even 210, and the DAEP 214. Although the digital code of the DAEP 214 has been already determined in the first sequence, the processor 110 may finely tune the digital code that was determined in the first sequence to compensate for a residual offset in the HF 202 and the VGA 204. The digital code of the DAEP 214 determined in the first sequence may minimize a self-offset of the DFE even 210 and the DAEP 214, and the digital code of the DAEP 214 determined in the fifth sequence may minimize an offset of the DFE even 210 and the DAEP 214 by also considering the residual offset of the HF 202 and the VGA 204.

Through the above process (the first to fifth sequences), the processor 110 may minimize an offset of the HF 202, the VGA 204, the DFE even 210, and the DAEP 214. Thereafter, the processor 110 may calibrate the other 1-bit samplers, i.e., the EREP 212 and the EDEP 216, connected to the DFE even 210. When the EREP 212 and the EDEP 216 are calibrated, the processor 110 may use the digital codes of the HF 202 and the VGA 204 determined through the first to fifth sequences as they are.

Figure 2F:
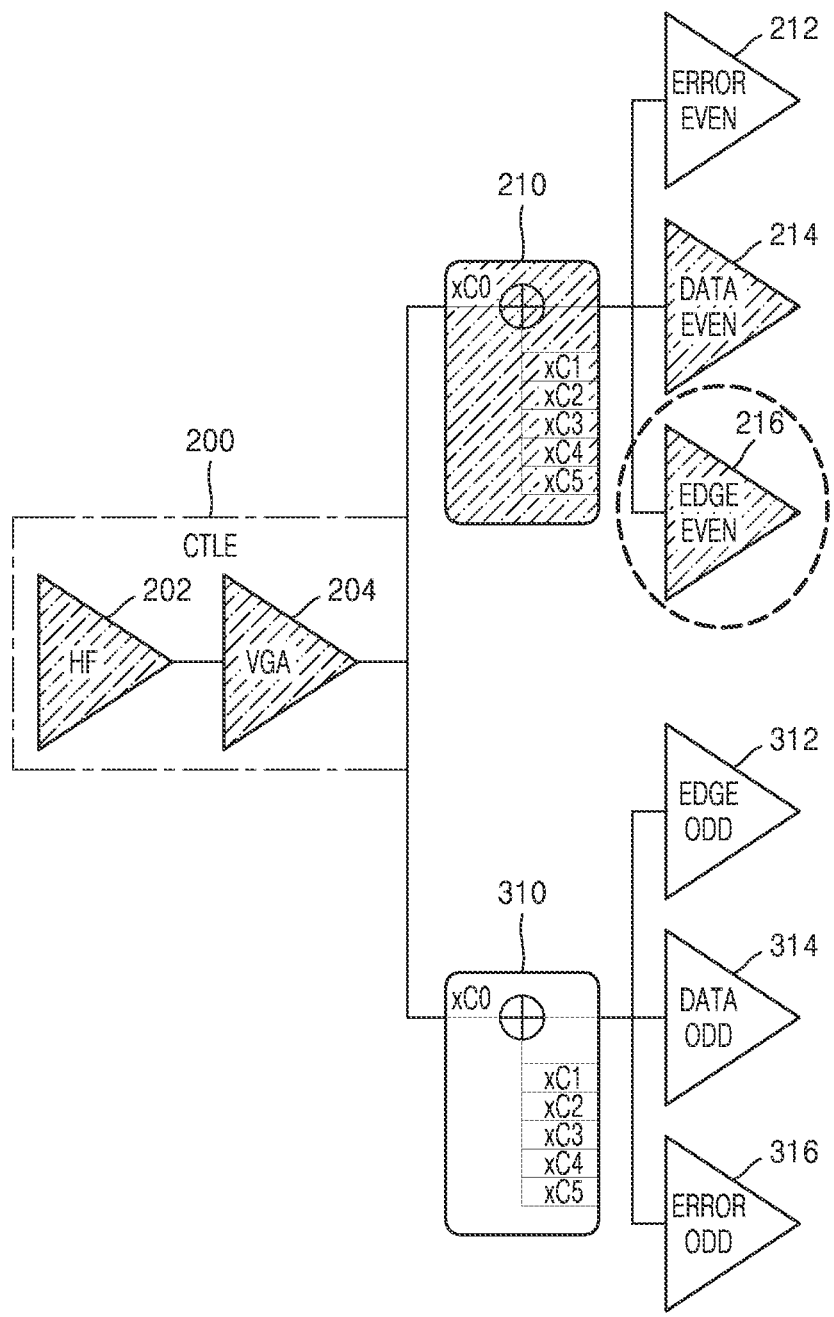

Referring to FIG. 2F, in the sixth sequence, the processor 110 may calibrate the HF 202, the VGA 204, the DFE even 210, and the EDEP 216 by applying the common mode voltage to the front end of the HF 202 and determining a digital code of the EDEP 216. The digital code of the EDEP 216 determined in the sixth sequence may minimize not only a self-offset of the DFE even 210 and the EDEP 216 but also an amplified residual offset remaining in the HF 202 and the VGA 204.

Figure 2G:
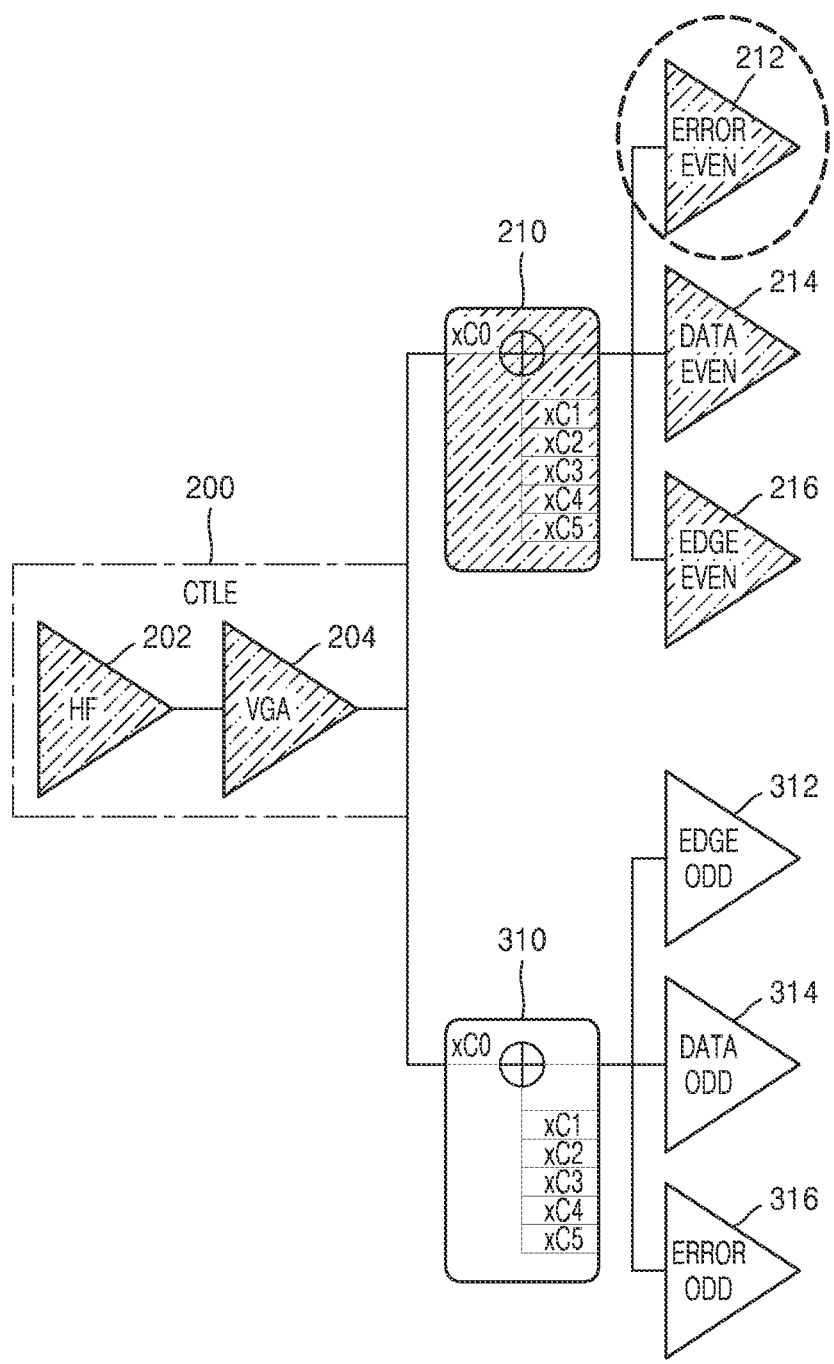

Referring to FIG. 2G, in the seventh sequence, the processor 110 may calibrate the HF 202, the VGA 204, the DFE even 210, and the EREP 212 by applying the common mode voltage to the front end of the HF 202 and determining a digital code of the EREP 212. The digital code of the EREP 212 determined in the seventh sequence may minimize not only a self-offset of the DFE even 210 and the EREP 212 but also the amplified residual offset remaining in the HF 202 and the VGA 204.

Referring to FIG. 3, in the eighth to tenth sequences, the processor 110 may calibrate the DFE odd 310 and the EROP 316, the DAOP 314, and the EDOP 312 connected to the DFE odd 310. In the eighth to tenth sequences, calibration may be performed by applying the common mode voltage to the front end of the HF 202 and determining a digital code of each path. A method of calibrating a DFE odd 310 part is similar to the seventh sequence described with reference to FIG. 2G, and thus, a description thereof is omitted for conciseness.

A method, performed by the processor 110, of performing calibration, according to an embodiment, is the same as described with reference to FIGS. 2A to 3. The processor 110 may provide a user interface so that the user may freely configure the first sequence to the Nth sequence on firmware. The processor 110 may configure an offset calibration sequence based on a user input. In other words, the processor 110 may determine an order in which the modules are calibrated based on the user input. For example, the processor 110 may determine based on a user input that the EDEP 216 is calibrated in the first to fifth sequences and the DAEP 214 is calibrated in the sixth sequence. For example, the processor 110 may determine based on a user input that not a DFE even 210 part but the DFE odd 310 part is calibrated in the first to seventh sequences and the DFE even 210 part is calibrated in the eighth to tenth sequences. A calibration sequence change which the processor 110 may provide through firmware update is not limited to the above illustrations, and a target module, a position to which the common mode voltage is to be applied, and a code search scheme may be freely changed.

Figure 4:
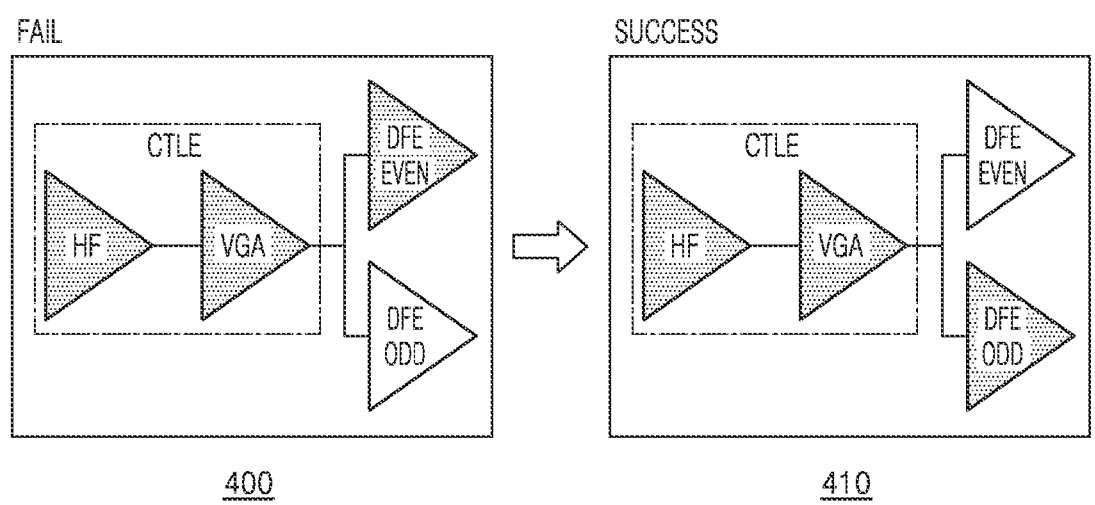
FIG. 4 illustrates a method of performing calibration when a calibration process shown in FIGS. 2A to 3 fails, according to some embodiments.

FIG. 4 illustrates a method of performing calibration when the calibration process shown in FIGS. 2A to 3 fails, according to some embodiments.

The calibration process described with reference to FIGS. 2A to 3 may be performed in a manner 400 of first compensating for the offset of the DFE even 210 and then compensating for the offset of the DFE odd 310. As shown in FIGS. 2A to 3, a calibration result of the HF 202 and the VGA 204, which is determined through the first to fifth sequences, may affect calibration of all of the EDEP 216, the EREP 212, and the DFE odd 310. However, when a digital code, by which an offset and a residual offset are minimized in the HF 202 or the VGA 204, cannot be determined due to the DFE even 210, the DFE odd 310 may also not be normally calibrated.

For example, when the offset of the DAEP 214 is too large to be compensated for with an input offset voltage of the DAEP 214, the offset of the DAEP 214 may be compensated for by tuning a digital code value of the HF 202 or the VGA 204. If the digital code value of the HF 202 or the VGA 204 is affected from offset compensation of the DAEP 214, a digital code different from self-offset minimization of the HF 202 or the VGA 204 may be selected. Therefore, calibration of the DFE odd 310 using the digital code of the HF 202 or the VGA 204 affected by the offset of the DAEP 214 may be inaccurate. The processor 110 may determine that calibration has failed if the digital code of the HF 202 or the VGA 204 is affected by an offset of a 1-bit sampler or the digital code of the HF 202 is affected by an offset of the VGA 204 or the 1-bit sampler.

If the processor 110 determines that calibration of the DFE even 210 has failed, the processor 110 may first perform calibration of the DFE odd 310 in a manner 410. If the calibration of the DFE odd 310 is successful, the processor 110 may calibrate the DFE even 210 by using the determined digital codes of the HF 202 and the VGA 204. According to an embodiment, if the calibration of the DFE even 210 has failed, sequences in which the DFE odd 310 is first calibrated may be configured by a user input through firmware update.

Figure 5:
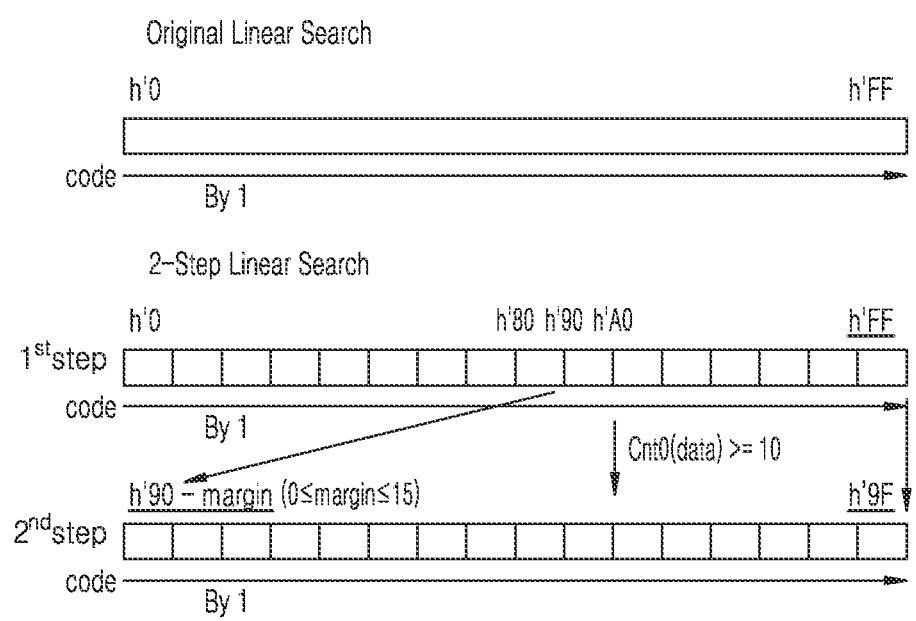
FIG. 5 illustrates a method, performed by an electronic device, of determining a digital code to be input to a digital-to-analog converter (DAC) in each module, according to some embodiments.

FIG. 5 illustrates a method, performed by an electronic device, of determining a digital code to be input to a DAC in each module, according to some embodiments.

The processor 110 may determine a digital code for minimizing an offset of a target module. The processor 110 may input the determined digital code to a DAC of the target module, and an analog voltage signal converted as a level corresponding to the digital code by the DAC may minimize the offset. Since the digital code is determined quickly, a time taken for calibration may be reduced. Hereinafter, a two-step linear search that is a code search scheme for quickly determining a digital code is described.

The processor 110 may divide a unit voltage into a determined number of voltage levels and assign a corresponding digital code to each voltage level. For example, referring to FIG. 5, the processor 110 may divide the unit voltage into 256 voltage levels $$(\frac{1}{256}V, \frac{2}{256}V, \frac{3}{256}V, ...)$$

and respectively assign digital codes (h'0 to h'FF) to the 256 voltage levels.

In an original linear search, the processor 110 may sequentially input the digital codes to a DAC of a target module (e.g., h'0→h'1→h'2→ . . . →h'FF) and determine a digital code, by which an offset is maximally compensated for. For example, if the offset is 0.6 V, the processor 110 may determine that the offset is maximally compensated for when a digital code (h'99) corresponding to a voltage level $$(\frac{154}{256}V)$$

is input while sequentially inputting digital codes. Therefore, the processor 110 may compensate for the offset of the target module after inputting 155 digital codes (it may be identified that an output voltage of the target module decreases up to 154 digital codes, and when a 155th digital code is input, the output voltage of the target module increases). The original linear search takes too long. To address the original linear search taking too long, the two-step linear search may be used.

In the two-step linear search, the processor 110 may generate subsets each including a determined search length (e.g., 16) of digital codes. The processor 110 may determine a subset including a digital code, by which the offset is maximally compensated for, by sequentially inputting a first digital code of each subset to the DAC. The processor 110 may find out an optimal digital code by sequentially inputting digital codes included in the determined subset to the DAC.

For example, when the processor 110 determines a search length as 16, in the example described above, the processor 110 may determine that the optimal digital code is included in a tenth subset (h'90 to h'9F), by sequentially inputting 10 digital codes to the DAC. The processor 110 may sequentially input digital codes in the tenth subset to the DAC, and when h'90, h'91, h'92, h'93, . . . are sequentially input to the DAC, it may be determined that h'99 is the optimal digital code. That is, the optimal digital code may be determined through total 21 inputs. Therefore, a digital code may be determined much more quickly in the two-step linear search than in the original linear search.

According to an embodiment, the processor 110 may determine a subset including an optimal digital code and then input digital codes to the DAC sequentially from a digital code smaller by a determined margin (e.g., 0≤margin≤15) from a first digital code of the determined subset. Even when a calculation error has occurred in a code search, the margin may be given to improve digital code search accuracy. For example, in the example described above, when it is determined that the optimal digital code is included in the tenth subset, digital codes may be input to the DAC sequentially from a digital code (belonging to the ninth subset) previous by the determined margin from the first digital code of the tenth subset.

Figure 6:
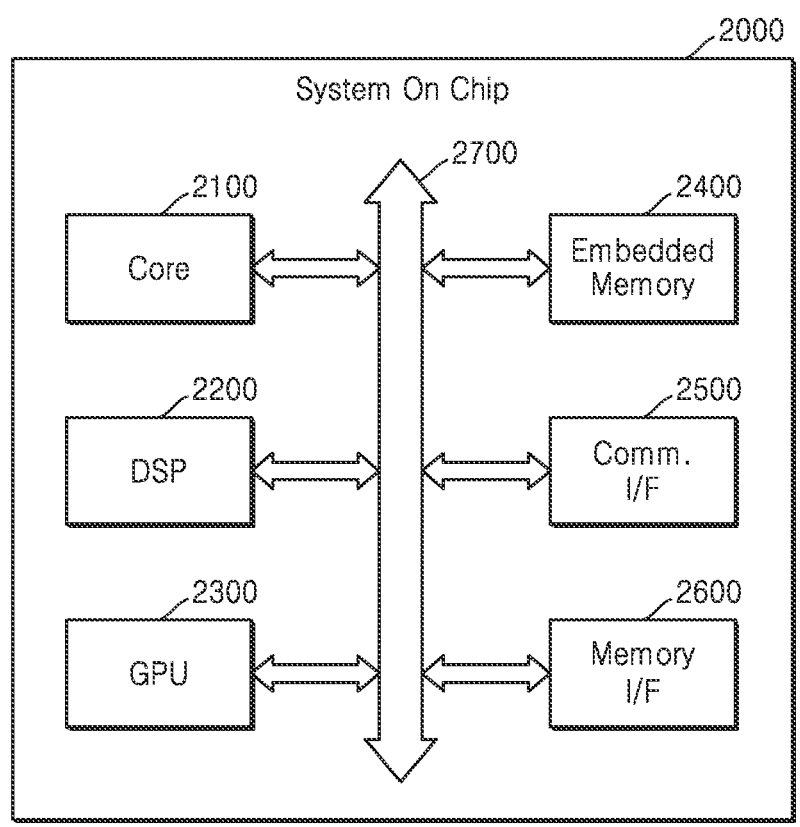
FIG. 6 is a block diagram illustrating a system-on-chip including an equalizer, according to some embodiments.

FIG. 6 is a block diagram illustrating a system-on-chip (SoC) 2000 according to some embodiments.

Referring to FIG. 6, the SoC 2000 may indicate an integrated circuit, in which components of a computing system or another electronic system are integrated. For example, an application processor (AP) as one type of the SoC 2000 may include a processor and components for other functions. As shown in FIG. 6, the SoC 2000 may include a core 2100, a digital signal processor (DSP) 2200, a graphics processing unit (GPU) 2300, an embedded memory 2400, a communication interface (I/F) 2500, and a memory interface (I/F) 2600. The components of the SoC 2000 may communicate with each other via a bus 2700.

The core 2100 may process instructions and control operations of components included in the SoC 2000. For example, the core 2100 may process a series of instructions to run an operating system and execute applications on the operating system. The DSP 2200 may generate useful data by processing a digital signal, e.g., a digital signal provided from the communication interface 2500. The GPU 2300 may generate data for an image to be output through a display device, from image data provided from the embedded memory 2400 or the memory interface 2600, or encode the image data. The embedded memory 2400 may store data required for the core 2100, the DSP 2200, and the GPU 2300 to operate. The memory interface (I/F) 2600 may provide an interface for an external memory, e.g., dynamic random access memory (DRAM), flash memory, or the like, of the SoC 2000. In some embodiments, the SoC 2000 may perform the offset calibration process described above with respect to FIGS. 2A-5. For example, in some embodiments, the core 2100 may correspond to the processor 110 in FIG. 1.

An electronic device for performing offset calibration in an AFE circuit, according to some embodiments, includes a plurality of modules included in the AFE circuit and at least one processor, wherein the at least one processor is configured to provide a user interface for a firmware update, determine a target module, of which offset calibration is to be performed, among the plurality of modules, based on a user input to the user interface, determine a position to which a common mode voltage is to be applied, when the offset calibration of the target module is performed, and determine a calibration sequence including the target module and the position to which the common mode voltage is to be applied.

According to some embodiments, the at least one processor may be further configured to allocate a digital code to each level by dividing a unit voltage into N (N being an integer) levels, generate a plurality of subsets each including a determined search length of digital codes among the N digital codes, sequentially measure output voltages by applying the common mode voltage and inputting a first digital code of each subset to a DAC of a target module in an ascending order, detect a subset including a digital code by which an output voltage is minimized, among the sequentially measured output voltages, sequentially measure output voltages by applying the common mode voltage and inputting a plurality of digital codes belonging to the detected subset to the DAC in an ascending order, and determine a digital code by which an output voltage is minimized, among the sequentially measured output voltages.

According to some embodiments, the at least one processor may be further configured to input digital codes to the DAC of the target module in an ascending order from a digital code smaller by a determined margin from a first digital code of the detected subset.

According to some embodiments, the at least one processor may be further configured to determine a code search scheme for searching for the digital code, based on a user input to the user interface, and determine a calibration sequence further including the code search scheme.

According to some embodiments, the AFE circuit may include a CLTE module including an HF module and a VGA module electrically connected to the HF module, a DFE module electrically connected to the CLTE module, at least one 1-bit sampler electrically connected to the DFE module, and at least one DAC connected to the at least one 1-bit sampler and configured to convert an input digital code into an analog voltage signal and output the analog voltage signal.

In addition, according to the technical idea of the inventive concept, the DFE module may include a DFE even and a DFE odd, and the at least one 1-bit sampler may include an EREP, a DAEP, and an EDEP connected to the DFE even, and an EROP, a DAOP, and an EDOP connected to the DFE odd.

According to some embodiments, the at least one processor may be further configured to determine a plurality of offset calibration sequences, based on a user input to the user interface and sequentially execute the plurality of offset calibration sequences in response to receiving a calibration performing command.

According to some embodiments, at least one offset calibration sequence may include a sequence stop flag, and the at least one processor may be further configured to stop an offset calibration sequence in response to confirming the sequence stop flag while sequentially executing the plurality of offset calibration sequences.

According to some embodiments, the at least one processor may be further configured to configure at least one offset calibration sequences by performing the firmware update during a system idle time. The system idle time may refer to a time when the electronic device including the at least one processor is not used. For example, in some embodiments, a time when the core 2100 corresponding to the processor 110 in FIG. 1 does not perform the offset calibration may be described as the system idle time.

According to some embodiments, the at least one processor may be further configured to measure an output voltage by applying the common mode voltage to a front end of the target module, determine an offset of the target module, based on the output voltage, determine a digital code corresponding to the determined offset, and input the digital code to a DAC connected to the target module to apply a voltage for compensating for the offset.

According to some embodiments, the electronic device may further include a first target module and a second target module connected to a front end of the first target module, wherein the at least one processor may be further configured to measure a first offset of the first target module, based on a voltage output by applying the common mode voltage to the first target module, input a first digital code corresponding to the first offset to a first DAC connected to the first target module, measure a second offset of the second target module, based on a voltage output by applying the common mode voltage to the second target module, and input a second digital code corresponding to the second offset to a second DAC connected to the second target module.

According to some embodiments, the at least one processor may be further configured to: re-measure the first offset of the first target module, based on a voltage output by applying the common mode voltage to the second target module, after inputting the second digital code to the second DAC; and input a $(1-2)^{th}$ digital code corresponding to the re-measured first offset to the first DAC.

According to some embodiments, an AFE circuit for offset calibration may include a CTLE module including an HF module and a VGA module electrically connected to the HF module, a DFE module electrically connected to the CLTE module, at least one 1-bit sampler electrically connected to the DFE module, at least one DAC connected to the at least one 1-bit sampler and configured to convert an input digital code into an analog voltage signal and output the analog voltage signal, and a control module configured to provide a user interface for a firmware update and, based on a user input to the user interface, determine a target module of which offset calibration is to be performed, a position to which a common mode voltage is to be applied in the AFE circuit, and a digital code search scheme. For example, the control module may vary the target module of which offset calibration is to be performed, the position to which the common mode voltage is to be applied when each module is calibrated, and a code search scheme, based on the user input.

Figure 7:
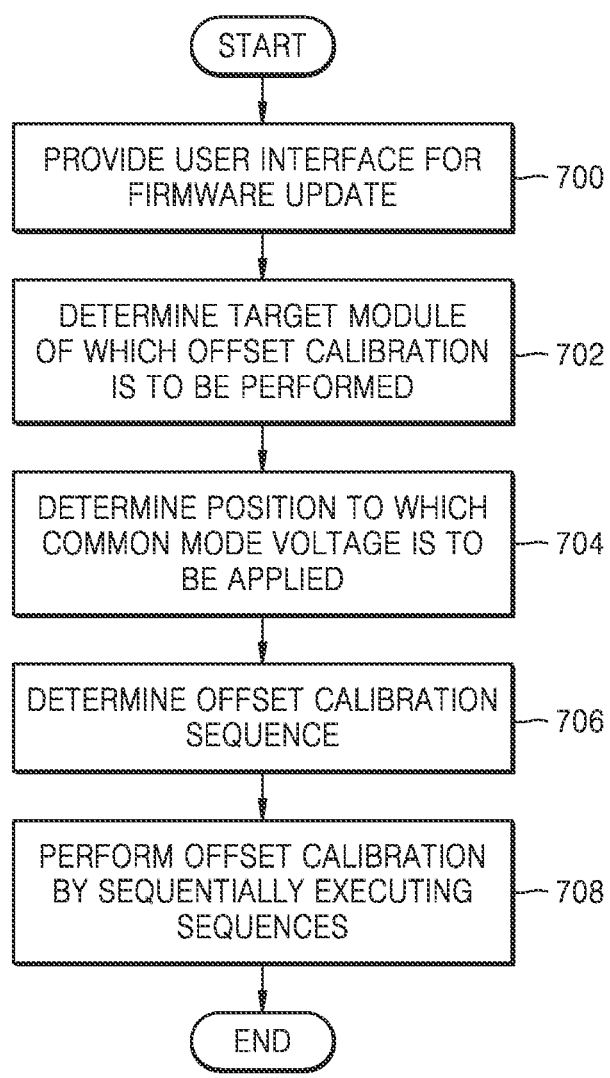
FIG. 7 is a flowchart illustrating a method, performed by an electronic device, of determining an offset calibration sequence, according to some embodiments.

FIG. 7 is a flowchart illustrating a method, performed by an electronic device, of determining an offset calibration sequence, according to some embodiments. For example, the method of FIG. 7 may be performed by the SoC 2000 described with respect to FIG. 6 or by the processor 110 described with respect to FIG. 1.

In operation 700, the electronic device may provide a user interface for a firmware update. For example, the electronic device may provide the user interface for an offset calibration sequence configuration in an initial firmware configuration. The electronic device may determine an offset calibration sequence according to a user input through the user interface.

In operation 702, the electronic device may determine a target module of which offset calibration is to be performed. According to an embodiment, the electronic device may determine a target module of which offset calibration is to be performed, based on a user input to the user interface. In some embodiments, among a plurality of modules included in an AFE circuit, the electronic device may map one target module to one sequence. The electronic device may determine a plurality of target modules respectively corresponding to a plurality of sequences based on the user input. In some embodiments, the same target module may be mapped to each sequence. For example, the electronic device may determine the same module as a target module in a first sequence and a second sequence.

In operation 704, the electronic device may determine a position to which the common mode voltage is to be applied in the AFE circuit. For example, the electronic device may determine the position to which the common mode voltage is to be applied in the AFE circuit, when the offset calibration is performed. The electronic device may determine a position to which the common mode voltage is to be applied in each sequence. Even though the offset calibration is performed for the same target module, a position to which the common mode voltage is to be applied may vary, as described above with respect to FIGS. 2A-3.

In operation 706, the electronic device may determine a calibration sequence including the target module and the position to which the common mode voltage is to be applied. The electronic device may determine the target module and the position, to which the common mode voltage is to be applied, based on the user input to the user interface. The electronic device may determine one target module and one position, to which the common mode voltage is to be applied, for each sequence.

According to an embodiment, the electronic device may determine a scheme of searching for a digital code, which is to be input to a DAC connected to a target module. The electronic device may determine a digital code by using various code search schemes. For example, the electronic device may determine a digital code by using one of a linear search scheme, a binary search scheme, and a two-step linear search scheme. The electronic device may determine a digital code, which is to be input to a DAC of a target module in each sequence, based on a user input to the user interface.

In operation 708, the electronic device may perform offset calibration by sequentially executing sequences. For example, the electronic device may perform the offset calibration by sequentially executing the determined offset calibration sequences. The sequences may be stored.

A method of performing offset calibration in an AFE circuit, according to some embodiments, may include providing a user interface for firmware update, determining a target module, of which offset calibration is to be performed, among a plurality of modules included in the AFE circuit, based on a user input to the user interface, determining a position to which a common mode voltage is to be applied, when the offset calibration of the target module is performed, and determining a calibration sequence including the target module and the position to which the common mode voltage is to be applied.

According to some embodiments, the method may further include allocating a digital code to each level by dividing a unit voltage into N (N being an integer) levels, generating a plurality of subsets each including a determined search length of digital codes among the N digital codes, sequentially measuring output voltages by applying the common mode voltage and inputting a first digital code of each subset to a DAC of a target module in an ascending order, detecting a subset including a digital code by which an output voltage is minimized, among the sequentially measured output voltages, sequentially measuring output voltages by applying the common mode voltage and inputting a plurality of digital codes belonging to the detected subset to the DAC in an ascending order, and determining a digital code by which an output voltage is minimized, among the sequentially measured output voltages.

According to some embodiments, the determining of the digital code by which the output voltage is minimized may further include inputting digital codes to the DAC of the target module in an ascending order from a digital code smaller by a determined margin from a first digital code of the detected subset.

According to some embodiments, the determining of the digital code by which the output voltage is minimized may further include determining a code search scheme for searching for the digital code, based on a user input to the user interface, and determining a calibration sequence further including the code search scheme.

According to some embodiments, the method may further include measuring an output voltage by applying the common mode voltage to a front end of the target module, determining an offset of the target module, based on the output voltage, determining a digital code corresponding to the determined offset, and inputting the digital code to a DAC connected to the target module to apply a voltage for compensating for the offset.

According to some embodiments, the performing of the offset calibration may include measuring a first offset of a first target module, based on a voltage output by applying the common mode voltage to the first target module, inputting a first digital code corresponding to the first offset to a first DAC connected to the first target module, measuring a second offset of a second target module, based on a voltage output by applying the common mode voltage to the second target module, and inputting a second digital code corresponding to the second offset to a second DAC connected to the second target module.

According to some embodiments, the performing of the offset calibration may further include re-measuring the first offset of the first target module, based on a voltage output by applying the common mode voltage to the second target module, after inputting the second digital code to the second DAC, and inputting a $(1-2)^{th}$ digital code corresponding to the re-measured first offset to the first DAC.

Figure 8:
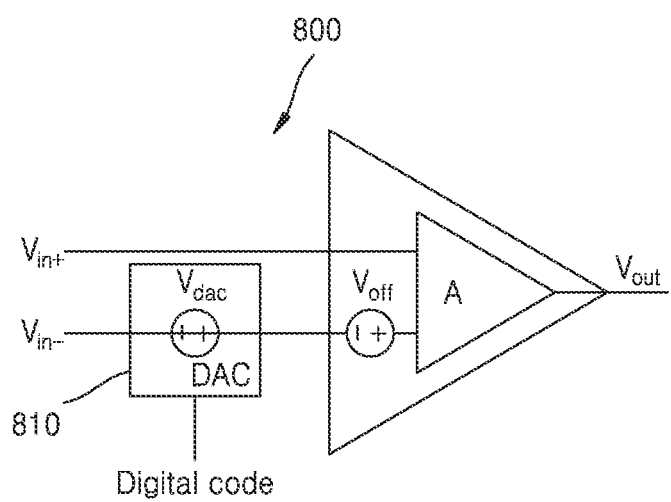
FIG. 8 illustrates an operating method of an amplifier included in an electronic device, according to some embodiments.

FIG. 8 illustrates a method of operating an amplifier 800 included in an electronic device, according to some embodiments.

An HF, a VGA, a DFE even, an EREP, a DAEP, an EDEP, a DFE odd, an EDOP, a DAOP, and an EROP included in the electronic device may each be implemented in the form of the amplifier 800. Each amplifier 800 may generate an output voltage by receiving two input voltages. Referring to FIG. 8, the amplifier 800 may receive a first input voltage $V_{in+}$ and a second input voltage $V_{in-}$. When the common mode voltage (the first input voltage $V_{in+}$=the second input voltage $V_{in-}$=0 V) is applied to an ideal amplifier with no offset $V_{off}$, an output voltage level is 0 V. However, when the amplifier 800 includes the offset $V_{off}$, a digital code may be input to a DAC 810 to generate an analog voltage $V_{dac}$, thereby offsetting the offset $V_{off}$. An output voltage $V_{out}$ of the amplifier 800 may be represented by Equation 2 below.

$$V_{out}=A((V_{in+}-V_{in-})+(V_{off}-V_{dac})) \qquad [\text{Equation 2}]$$

where $V_{out}$ denotes an output voltage,
$V_{in+}$ denotes a first input voltage,
$V_{in-}$ denotes a second input voltage,
A denotes an amplifier gain,
$V_{off}$ denotes an offset voltage, and
$V_{dac}$ denotes an analog voltage.

Each amplifier 800 may select a digital code, by which the output voltage $V_{out}$ calculated through Equation 2 is 0 V, and input the selected digital code to the DAC 810.

While various embodiments have been particularly shown and described with reference to the drawings, it will be understood that various changes in form and details may be made therein without departing from the spirit and scope of the following claims.

What is claimed is:

1. An electronic device comprising:
an analog front end (AFE) circuit including a plurality of modules; and
at least one processor configured to:
provide a user interface for a firmware update,
determine a target module, of which offset calibration is to be performed, among the plurality of modules, based on a user input to the user interface,
determine a position within in the AFE circuit to which a common mode voltage is to be applied to perform the offset calibration of the target module, and
determine an offset calibration sequence including the target module and the position.

2. The electronic device of claim 1, wherein the at least one processor is further configured to:
divide a unit voltage into N levels, N being an integer, and allocate a digital code to each of the N levels,
generate a plurality of subsets of the N digital codes, each subset including a determined search length of digital codes among the N digital codes,
apply the common mode voltage to the position within the AFE circuit and input a first digital code of each subset to a digital-to-analog converter (DAC) of the target module in an ascending order of the first digital codes, and sequentially measure first output voltages of the DAC,
detect a subset of the plurality of subsets that includes a digital code that corresponds to a minimum output voltage among the first output voltages,
apply the common mode voltage to the position within the AFE circuit and input a plurality of digital codes belonging to the detected subset to the DAC in an ascending order of the plurality of digital codes belonging to the detected subset, and sequentially measure second output voltages from the DAC,
determine a digital code that corresponds to a minimum output voltage among the second output voltages.

3. The electronic device of claim 2, wherein the at least one processor is further configured to input the plurality of digital codes belonging to the detected subset to the DAC of the target module in an ascending order from a digital code smaller by a determined margin from a first digital code of the plurality of digital codes belonging to the detected subset.

4. The electronic device of claim 3, wherein the at least one processor is further configured to determine a code search scheme, based on a user input to the user interface, and
determine a calibration sequence according to the code search scheme.

5. The electronic device of claim 1, wherein the plurality of modules of the AFE circuit comprise:
a continuous time linear equalizer (CLTE) module comprising an high frequency (HF) module and a video graphics array (VGA) module electrically connected to the HF module;
a decision feedback equalizer (DFE) module electrically connected to the CLTE module;
at least one 1-bit sampler electrically connected to the DFE module; and
at least one digital-to-analog converter (DAC) connected to the at least one 1-bit sampler and configured to convert an input digital code into an analog voltage signal and output the analog voltage signal.

6. The electronic device of claim 5, wherein:
the DFE module comprises a DFE even and a DFE odd, and
the at least one 1-bit sampler comprises an error even path (EREP), a data even path (DAEP), and an edge even path (EDEP) connected to the DFE even, and an error odd path (EROP), a data odd path (DAOP), and an edge odd path (EDOP) connected to the DFE odd.

7. The electronic device of claim 1, wherein the at least one processor is further configured to determine a plurality of the offset calibration sequence, based on the user input to the user interface and sequentially execute the plurality of offset calibration sequences based on receiving a calibration command.

8. The electronic device of claim 7, wherein at least one offset calibration sequence of the plurality of offset calibration sequences comprises a sequence stop flag, and
the at least one processor is further configured to stop an offset calibration sequence of the plurality of offset calibration sequences based on confirming the sequence stop flag while sequentially executing the plurality of offset calibration sequences.

9. The electronic device of claim 1, wherein the at least one processor is further configured to configure the offset calibration sequence by performing the firmware update during a system idle time.

10. The electronic device of claim 1, wherein the at least one processor is further configured to:
apply the common mode voltage to a front end of the target module and measure an output voltage that is output from the target module,
determine an offset of the target module, based on the output voltage,
determine a digital code corresponding to the offset, and
input the digital code to a digital-to-analog converter (DAC) connected to the target module to apply a voltage to the target module for compensating for the offset.

11. The electronic device of claim 1, wherein the target module is a first target module and the plurality of modules further comprises a second target module connected to a front end of the first target module,
wherein the at least one processor is further configured to apply the common mode voltage to the first target module and measure a first offset of the first target module, based on a voltage output from the first target module, input a first digital code corresponding to the first offset to a first DAC connected to the first target module, apply the common mode voltage to the second target module and measure a second offset of the second target module, based on a voltage output from the first target module, and input a second digital code corresponding to the second offset to a second DAC connected to the second target module.

12. The electronic device of claim 11, wherein the at least one processor is further configured to:

after the second digital code is input to the second DAC, apply the common mode voltage to the second target module and re-measure the first offset of the first target module, based on a voltage output from the first target module; and input a $(1\text{-}2)^{th}$ digital code corresponding to the re-measured first offset to the first DAC.

13. A method comprising:

providing a user interface for firmware update;

based on a user input to the user interface, determining a target module, for which offset calibration is to be performed, among a plurality of modules included in an analog front end (AFE) circuit;

determining a position within the AFE circuit to which a common mode voltage is to be applied for performing the offset calibration of the target module; and determining a calibration sequence including the target module and the position.

14. The method of claim 13, further comprising:

dividing a unit voltage into N levels, N being an integer, and allocating a digital code to each of the N levels, generating a plurality of subsets of the N digital codes, each subset including a determined search length of digital codes among the N digital codes, applying the common mode voltage to the position within the AFE circuit and inputting a first digital code of each subset to a digital-to-analog converter (DAC) of the target module in an ascending order of the first digital codes, and sequentially measuring first output voltages of the DAC, detecting a subset of the plurality of subsets that includes a digital code that corresponds to a minimum output voltage among the first output voltages, applying the common mode voltage to the position within the AFE circuit and inputting a plurality of digital codes belonging to the detected subset to the DAC in an ascending order of the plurality of digital codes belonging to the detected subset, and sequentially measuring second output voltages from the DAC, determining a digital code that corresponds to a minimum output voltage among the second output voltages.

15. The method of claim 14, wherein determining the digital code comprises:

inputting the plurality of digital codes belonging to the detected subset to the DAC of the target module in an ascending order starting from a digital code smaller by a determined margin from a first digital code of the plurality of digital codes belonging to the detected subset.

16. The method of claim 15, further comprising: determining a code search scheme, based on a user input to the user interface, and determining a calibration sequence according to the code search scheme.

17. The method of claim 13, further comprising:

applying the common mode voltage to a front end of the target module and measure an output voltage that is output from the target module, determining an offset of the target module, based on the output voltage, determining a digital code corresponding to the offset, and inputting the digital code to a digital-to-analog converter (DAC) connected to the target module to apply a voltage to the target module for compensating for the offset.

18. The method of claim 13, wherein the target module is a first target module and the plurality of modules further comprises a second target module connected to a front end of the first target module, and wherein the method further comprises:

applying the common mode voltage to the first target module and measuring a first offset of the first target module, based on a voltage output from the first target module, inputting a first digital code corresponding to the first offset to a first DAC connected to the first target module, applying the common mode voltage to the second target module and measuring a second offset of the second target module, based on a voltage output from the first target module, and inputting a second digital code corresponding to the second offset to a second DAC connected to the second target module.

19. The method of claim 18, wherein performing the offset calibration further comprises:

after the second digital code is input to the second DAC, applying the common mode voltage to the second target module and re-measuring the first offset of the first target module, based on a voltage output from the first target module; and inputting a $(1\text{-}2)^{th}$ digital code corresponding to the re-measured first offset to the first DAC.

20. An analog front end (AFE) circuit comprising:

a continuous time linear equalizer (CLTE) module comprising an HF module and a video graphics array (VGA) module electrically connected to the HF module;

a decision feedback equalizer (DFE) module electrically connected to the CLTE module;

at least one 1-bit sampler electrically connected to the DFE module;

at least one digital-to-analog converter (DAC) connected to the at least one 1-bit sampler and configured to convert an input digital code into an analog voltage signal and output the analog voltage signal; and a control module configured to provide a user interface for a firmware update and, based on a user input to the user interface, determine a target module of which offset calibration is to be performed, a position within the AFE circuit to which a common mode voltage is to be applied, and a digital code search scheme.

* * * * *